United States Patent
Watanabe

(10) Patent No.: US 6,231,132 B1
(45) Date of Patent: May 15, 2001

(54) BRAKE PRESSURE CONTROL DEVICE FOR VEHICLE INCLUDING BRAKE PRESSURE EQUALIZING DEVICE

(75) Inventor: Kazuya Watanabe, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/107,470

(22) Filed: Jun. 30, 1998

(30) Foreign Application Priority Data

Jun. 30, 1997 (JP) .................................................. 9-174185

(51) Int. Cl.$^7$ ...................................................... B60T 8/32
(52) U.S. Cl. ...................... 303/116.2; 303/87; 303/113.5
(58) Field of Search ............................. 303/116.1, 116.2, 303/113.5, 117.1, 115.4, 113.1

(56) References Cited

U.S. PATENT DOCUMENTS

| | | | |
|---|---|---|---|
| 5,040,854 | * 8/1991 | Arikawa | 303/113.5 |
| 5,342,120 | * 8/1994 | Zimmer et al. | 303/116.2 |
| 5,417,483 | * 5/1995 | Sigl | 303/113.5 |
| 5,567,022 | * 10/1996 | Linkner, Jr. | 303/87 |
| 5,984,430 | * 11/1999 | Koga et al. | 303/116.2 |
| 6,007,163 | * 12/1999 | Sawada | 303/116.2 |

FOREIGN PATENT DOCUMENTS 8-133059   5/1996   (JP)

* cited by examiner .

Primary Examiner—Matthew C. Graham
(74) Attorney, Agent, or Firm—Burns, Doane, Swecker & Mathis, LLP

(57) ABSTRACT

A brake pressure control device for a vehicle includes a master cylinder, a front wheel brake connected to the master cylinder through a front brake conduit, a rear wheel brake connected to the master cylinder through a rear brake conduit, a front reservoir connected to the front wheel brake and a rear reservoir connected to the rear wheel brake. A front control valve selectively connects the front wheel brake to one of the master cylinder and the front reservoir, and a rear control valve selectively connects the rear wheel brake to one of the master cylinder and the rear reservoir. A front fluid pump discharges brake fluid to the master cylinder from the front reservoir, while a rear fluid pump discharges brake fluid to the master cylinder from the rear reservoir. A front changeover valve selectively connects and disconnects the master cylinder to and from a discharge port of the front fluid pump, and a rear changeover valve selectively connects and disconnects the master cylinder to and from a discharge port of the rear fluid pump. A front suction conduit connects the master cylinder and a suction port of the front fluid pump while a rear suction conduit connects the master cylinder and a suction port of the rear fluid pump. A pressure arrangement mechanism is connected to the front brake conduit between the front control valve and the front changeover valve, and is connected to the rear brake conduit between the rear control valve and the rear changeover valve.

16 Claims, 2 Drawing Sheets

Figure 1:
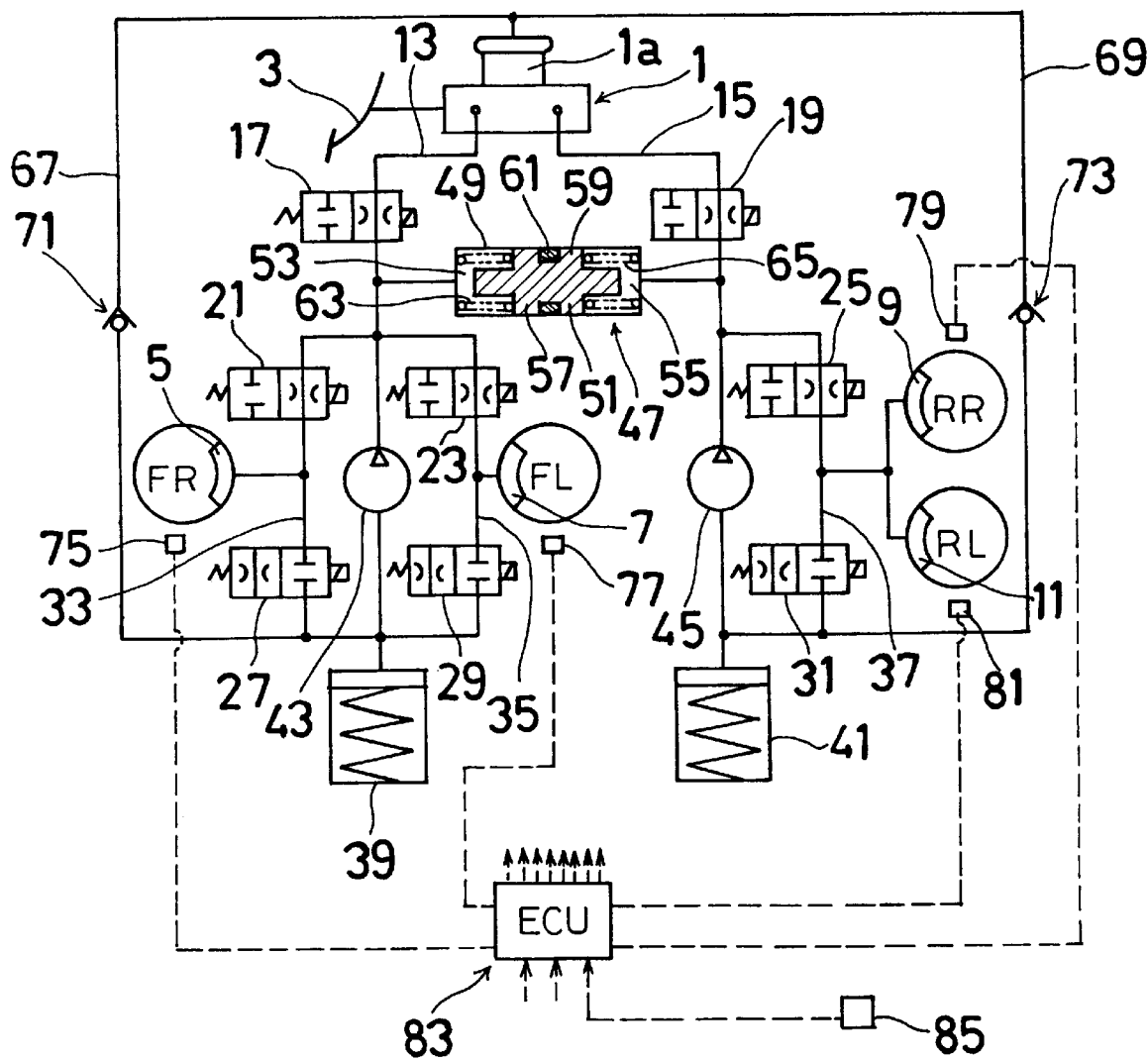

BRAKE PRESSURE CONTROL DEVICE FOR VEHICLE INCLUDING BRAKE PRESSURE EQUALIZING DEVICE

The present application is based on and claims priority under 35 U.S.C. § 119 with respect to Japanese Patent Application No. 09-174185 filed on Jun. 30, 1997, the entire content of which is incorporated herein by reference.

FIELD OF THE INVENTION

The present invention generally relates to a vehicle brake control device. More particularly, the present invention pertains to a brake pressure control device for a vehicle for use in an anti-lock control apparatus, a traction control apparatus and/or an automatic brake control apparatus.

BACKGROUND OF THE INVENTION

A conventional brake pressure control device for a vehicle is disclosed in Japanese Patent Laid Open No. 8(1996)-133059. The brake pressure control device disclosed in this publication includes a master cylinder, a pressure control valve, and a changeover valve disposed between the master cylinder and the pressure control valve. The changeover valve is designed to be switched to connect the master cylinder and the suction port of a fluid pump to supply brake fluid to each of the wheel brakes from the master cylinder when the brake pedal is not operated.

This conventional brake pressure control device is applied to a diagonal dual brake circuit mainly installed on a front engine front wheel drive vehicle having a pair of brake circuits, one of which is connected to the front right wheel brake and the rear left wheel brake and the other one of which is connected to the front left wheel brake and the rear right wheel brake.

When the above described device is applied to a front-rear dual brake circuit that is primarily installed on a front engine rear drive vehicle having a pair of circuits, one of which is connected to the front wheel brakes (front brake circuit) and the other one of which is connected to the rear wheel brakes (rear brake circuit), the brake pressure increase rate generated by the fluid pump differs between the front brake circuit and the rear brake circuit because brake fluid consumption differs between the front wheel brake and the rear wheel brake. Therefore, vehicle passengers may feel uncomfortable by the brake force difference between the front and rear of the vehicle.

If two fluid pumps each having a different capacity are applied to the front brake circuit and the rear brake circuit to address the foregoing drawback, the cost of the overall brake pressure control device is significantly increased.

In light of the foregoing, a need exists for a brake pressure control device that is not susceptible to the disadvantages and drawbacks associated with other known brake pressure control devices.

It would be desirable to provide a vehicle brake pressure control device that is able to equalize brake pressure differentials between the front brake circuit and the rear brake circuit.

SUMMARY OF THE INVENTION

Based on the forgoing, the present invention provides a vehicle brake pressure control device that includes a master cylinder, a front wheel brake connected to the master cylinder through a front brake conduit, a rear wheel brake connected to the master cylinder through a rear brake conduit, a front reservoir connected to the front wheel brake and a rear reservoir connected to the rear wheel brake. A front control valve selectively connects the front wheel brake to one of the master cylinder and the front reservoir, and a rear control valve selectively connects the rear wheel brake to one of the master cylinder and the rear reservoir. A front fluid pump discharges brake fluid to the master cylinder from the front reservoir, while a rear fluid pump discharges brake fluid to the master cylinder from the rear reservoir. A front changeover valve selectively connects and disconnects the master cylinder to and from a discharge port of the front fluid pump, and a rear changeover valve selectively connects and disconnects the master cylinder to and from a discharge port of the rear fluid pump. A front suction conduit connects the master cylinder and a suction port of the front fluid pump while a rear suction conduit connects the master cylinder and a suction port of the rear fluid pump. A pressure arrangement mechanism is connected to the front brake conduit between the front control valve and the front changeover valve, and is connected to the rear brake conduit between the rear control valve and the rear changeover valve.

According to another aspect of the present invention, a brake pressure control device for a vehicle includes a master cylinder, a front wheel brake connected to the master cylinder through a front brake conduit, a rear wheel brake connected to the master cylinder through a rear brake conduit, a front reservoir connected to the front wheel brake, rear reservoir connected to the rear wheel brake, a front control valve for selectively connecting and preventing connection of the front wheel brake to the master cylinder, and a rear control valve for selectively connecting and preventing connection of the rear wheel brake to the master cylinder. A front fluid pump discharges brake fluid to the master cylinder from the front reservoir and a rear fluid pump discharges brake fluid to the master cylinder from the rear reservoir. A front changeover valve is provided for selectively connecting and disconnecting the master cylinder to and from a discharge port of the front fluid pump, while a rear changeover valve is provided for selectively connecting and disconnecting the master cylinder to and from a discharge port of the rear fluid pump. A front suction conduit connects the master cylinder and a suction port of the front fluid pump, and a rear suction conduit connects the master cylinder and a suction port of the rear fluid pump. The brake pressure control device also includes a mechanism connected to the front brake conduit and the rear brake conduit for equalizing brake pressure differentials between the front wheel brake and the rear wheel brake.

BRIEF DESCRIPTION OF THE DRAWING FIGURES

Figure 2:
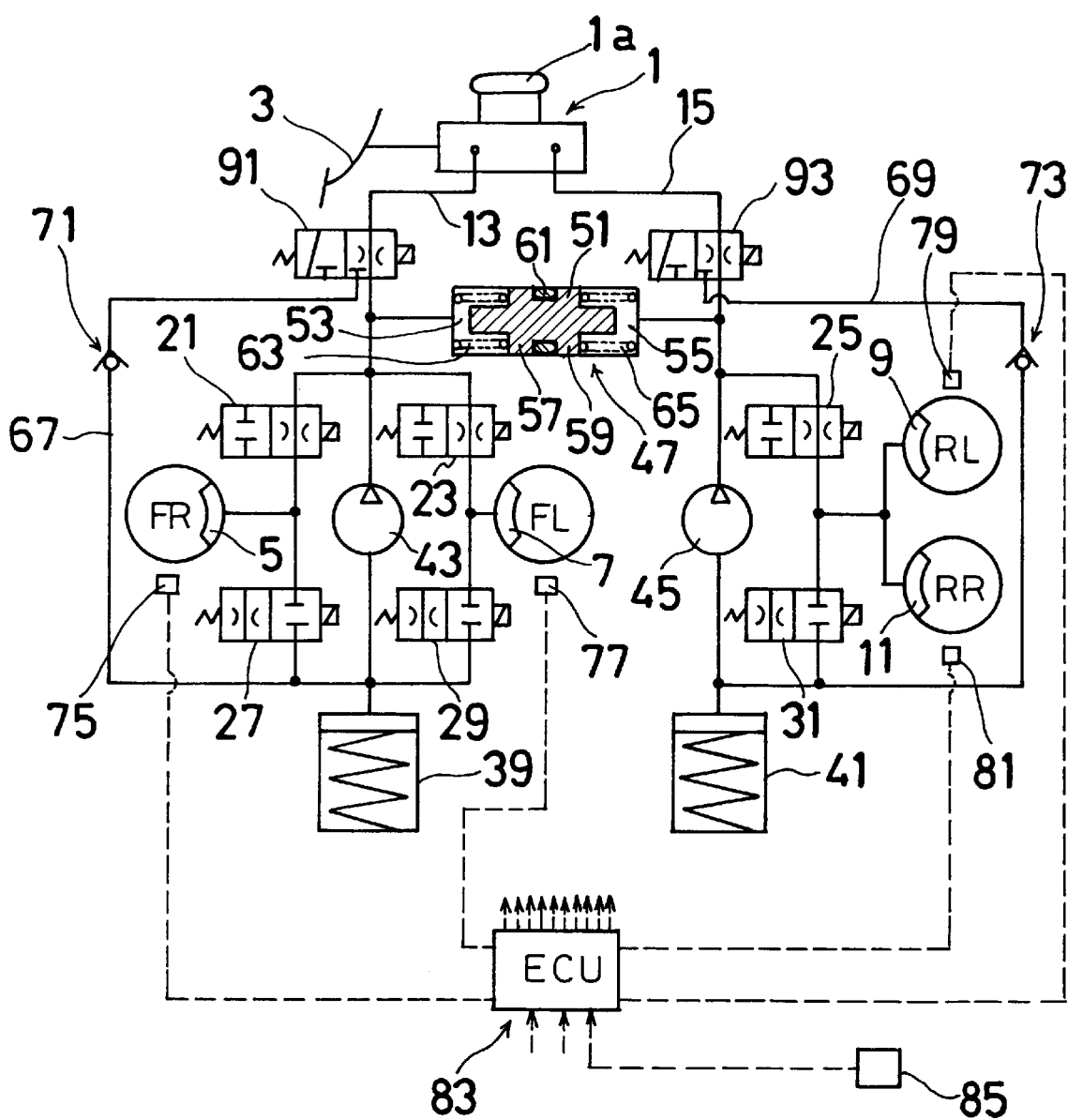

The foregoing and additional features and characteristics associated with the present invention will become more apparent from the following detailed description considered with reference to the accompanying drawing figures in which like elements are designated by like reference numerals and wherein:

FIG. 1 is a schematic illustration of a brake system which utilizes the brake pressure control device in accordance with a first embodiment of the present invention; and FIG. 2 is a schematic illustration of a brake system which utilizes the brake pressure control device in accordance with a second embodiment of the present invention.

DETAILED DESCRIPTION OF THE INVENTION

With reference initially to FIG. 1, a brake pressure control device for a vehicle in accordance with a first embodiment of the present invention is applied to the front-rear dual brake circuit that is mainly installed on front engine rear drive vehicles.

As seen in FIG. 1, a master cylinder 1 that includes a reservoir tank 1a is connected to a brake pedal 3 to generate brake pressure upon operation of the brake pedal 3. Wheel cylinders 5, 7, 9, 11 are mounted on the front right wheel FR, the front left wheel FL, the rear right wheel RR, and the rear left wheel RL respectively, The brake pressure generated in the master cylinder 1 is supplied to each of the wheel cylinders 5, 7, 9, 11 through a front brake conduit 13 and a rear brake conduit 15. In this way a braking force is applied to each of the wheels FR, FL, RR, RL of the vehicle.

The brake pressure generated in the master cylinder 1 is transmitted to the front right wheel cylinder 5 mounted on the front right wheel FR through a front changeover valve 17 and a front right control valve 21. In addition, the brake pressure generated in the master cylinder 1 is transmitted to the front left wheel cylinder 7 mounted on the front left wheel FL through the front changeover valve 17 and a front left control valve 23. Further, the brake pressure generated in the master cylinder 1 is transmitted to the rear wheel cylinders 9, 11 mounted on the rear wheels RR, RL through a rear changeover valve 19 and a rear control valve 25. Both the front changeover valve 17 and the rear changeover valve 19 are 2-position, 2-port electromagnetic valves.

The front right wheel cylinder 5 is connected to a front right reduction valve 27 and a front reservoir 39 through a front right relief conduit 33. The front left wheel cylinder 7 is connected to a front left reduction valve 29 and the front reservoir 39 through a front left relief conduit 35. The rear wheel cylinders 9, 11 are connected to a rear reduction valve 31 and a rear reservoir 41 through a rear relief conduit 37.

A front fluid pump 43 which is driven by an electric motor is disposed between the front reservoir 39 and each of the front control valves 21, 23. A rear fluid pump 45 which is driven by an electric motor is disposed between the rear reservoir 41 and the rear control valve 25.

The brake pressure control device is also provided with a brake pressure arrangement mechanism 47 that includes a cylinder 49 and a balance piston 51 slidably disposed in the cylinder 49. The balance piston 51 divides the cylinder 49 into a front variable volume chamber 53 disposed at the left side relative to the balance piston 51 and a rear variable volume chamber 55 disposed at the right side relative to the balance piston 51 as shown in FIG. 1. The balance piston 51 includes a pair of land portions 57, 59 between which a seal member 61 is fitted to provide a fluid-tight seal between the front variable volume chamber 53 and the rear variable volume chamber 55.

A pair of compression springs 63, 65 is provided in the cylinder, each of which is disposed between the balance piston 51 and one of the end portions of the cylinder 49. The springs 63, 65 locate the balance piston 51 at the neutral intermediate position within the cylinder 49 when no fluid pressure is generated in the front variable volume chamber 53 or the rear variable volume chamber 55.

A front suction conduit 67 connects the reservoir tank 1a of the master cylinder 1 to a suction port of the fluid pump 43. The front suction conduit 67 includes a check valve 71 which permits brake fluid flow from the reservoir tank 1a to the fluid pump 43, but prevents brake fluid flow from the fluid pump 43 to the reservoir tank 1a.

A rear suction conduit 69 connects the reservoir tank 1a of the master cylinder 1 to a suction port of the fluid pump 45. The rear suction conduit 69 includes a check valve 73 which permits brake fluid flow from the reservoir tank 1a to the fluid pump 45, but prevents brake fluid flow from the fluid pump 45 to the reservoir tank 1a.

Wheel speed sensors 75, 77, 79, 81 are operatively associated with the wheels FR, FL, RR, RL respectively. The wheel speed sensors 75, 77, 79, 81 are electrically connected to a controller 83 which is installed on the vehicle. The control valves 21, 23, 25, the fluid pumps 43, 45, the reduction valves 27, 29, 31 and the changeover valves 17, 19 are also electrically connected to the controller 83. Further, a front view sensor 85 which detects a vehicle located in front, an obstacle, a drive lane or the like is electrically connected to the controller 83.

The operation of the vehicle brake pressure control device shown in FIG. 1 is as follows. The following description focuses on the automatic brake control operation because the antilock control operation and the traction control operation are conventional.

When the controller 83 is aware of the existence of an obstacle in front of the vehicle through detection by the front view sensor 85, the controller 83 sends operational signals to the changeover valves 17, 19 and sends drive signals to the fluid pumps 43, 45. Each of the changeover valves 17, 19 is thus switched by the operational signal into a position which disconnects the master cylinder 1 from each of the control valves 21, 23, 25. The fluid pumps 43, 45 are driven by the drive signals from the controller 83.

The fluid pumps 43, 45 absorb or draw in brake fluid from the reservoir tank 1a of the master cylinder 1 through the suction conduits 67, 69 and the check valves 71, 73 respectively, and discharge the brake fluid to the wheel cylinders 5, 7, 9, 11 through the control valves 21, 23, 25 respectively to apply brake pressure to the wheels FR, FL, RR, RL.

At this time, a brake pressure differential tends to arise or be generated between the front wheel cylinders 5, 7 and the rear wheel cylinders 9, 11 because of differences in brake fluid consumption between the front wheel cylinders 5, 7 and the rear wheel cylinders 9, 11. When, for example, the brake pressures in the rear wheel cylinders 9, 11 tend to be higher than that in the front wheel cylinders 5, 7, the balance piston 51 of the brake pressure arrangement mechanism 47 automatically slides to the left with respect to the illustration in FIG. 1 because of the difference in brake pressure between the front variable volume chamber 53 (which is included in the front brake circuit) and the rear variable volume chamber 55 (which is included in the rear brake circuit). The balance piston 51 of the brake pressure arrangement mechanism 47 automatically slides to the left against the biasing force of the compression spring 63.

As the balance piston 51 moves, the volume of the front variable volume chamber 53 is reduced while the volume of the rear variable volume chamber 55 is increased. Thus, the brake pressure in the front brake circuit is increased and the brake pressure in the rear brake circuit is decreased. When the brake pressure differential between the front variable volume chamber 53 and the rear variable volume chamber 55 ceases, the balance piston 51 stops moving, with the brake pressures in the front brake circuit and the rear brake circuit being equalized.

Later on, when the controller 83 is made aware, through operation or detection by the front view sensor 85, that the obstacle in front of the vehicle is no longer present or has gone away, the controller 83 cancels the operational signals to the changeover valves 17, 19 and the drive signals to the fluid pumps 43, 45. Each of the changeover valves 17, 19 is thus switched back over to the position which connects the master cylinder 1 to each of the control valves 21, 23, 25. Further, the operation of the fluid pumps 43, 45 is stopped.

The brake fluid supplied to the wheel cylinders 5, 7, 9, 11 is returned to the master cylinder 1 through the control valves 21, 23, 25 and the changeover valves 17, 19 respectively.

By virtue of the present invention, when the brake pressure control device for a vehicle is applied to a traction control operation, the brake fluid discharged from the front fluid pump 43 also increases the brake pressure of the rear wheel cylinders 9, 11 through the brake pressure arrangement mechanism 47 to achieve a quick response during traction control operation.

A brake pressure control device for a vehicle in accordance with a second embodiment of the present invention is shown in FIG. 2. In the second embodiment shown in FIG. 2, the features of the vehicle brake pressure control device that are the same as those in the first embodiment are identified with the same reference numerals used in the first embodiment. The description set forth below focuses on those features not described above in connection with the first embodiment.

In the embodiment of the brake pressure control device shown in FIG. 2, the suction port of the front fluid pump 43, 45 is connected to the brake conduit 13 through a front changeover valve 91 while the suction port of the rear fluid pump 45 is connected to the brake conduit 15 through a rear changeover valve 93. Both the front changeover valve 91 and the rear changeover valve 93 are 2-position, 3-port electromagnetic valves.

When the controller 83 determines that an obstacle exists in front of the vehicle through appropriate detection by the front view sensor 85, the controller 83 sends operational signals to the changeover valves 91, 93. The changeover valves 91, 93 are thus switched into the alternative position to that shown in FIG. 2 so that the master cylinder 1 is disconnected from each of the control valves 21, 23, 25 and the fluid pumps 43, 45 are connected to the master cylinder 1 through the suction conduits 67, 69. The remainder of the operation of this second embodiment is the same as that described above in connection with the first embodiment.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A brake pressure control device for a vehicle comprising:

a master cylinder;

a front wheel brake connected to the master cylinder through a front brake conduit;

a rear wheel brake connected to the master cylinder through a rear brake conduit;

a front reservoir connected to the front wheel brake;

a rear reservoir connected to the rear wheel brake;

a front control valve which selectively connects the front wheel brake to one of the master cylinder and the front reservoir;

a rear control valve which selectively connects the rear wheel brake to one of the master cylinder and the rear reservoir;

a front fluid pump for discharging brake fluid to the master cylinder from the front reservoir;

a rear fluid pump for discharging brake fluid to the master cylinder from the rear reservoir;

a front changeover valve for selectively connecting and disconnecting the master cylinder to and from a discharge port of the front fluid pump;

a rear changeover valve for selectively connecting and disconnecting the master cylinder to and from a discharge port of the rear fluid pump;

a front suction conduit connecting the master cylinder and a suction port of the front fluid pump;

a rear suction conduit connecting the master cylinder and a suction port of the rear fluid pump; and a pressure arrangement mechanism connected to the front brake conduit between the front control valve and the front changeover valve and connected to the rear brake conduit between the rear control valve and the rear changeover valve, the pressure arrangement mechanism including a cylinder and a balance piston slidably disposed in the cylinder, the balance piston dividing the cylinder into a front variable volume chamber included in a front brake circuit and a rear variable volume chamber included in a rear brake circuit.

2. A brake pressure control device for a vehicle as recited in claim 1, wherein both the front changeover valve and the rear changeover valve are 2-position, 2-port electromagnetic valves.

3. A brake pressure control device for a vehicle as recited in claim 1, wherein both the front changeover valve and the rear changeover valve are 2-position, 3-port electromagnetic valves.

4. A brake pressure control device for a vehicle as recited in claim 1, wherein the rear wheel brake is a first rear wheel brake and including a second rear wheel brake connected to the master cylinder through the rear brake conduit.

5. A brake pressure control device for a vehicle comprising:

a master cylinder;

a front wheel brake connected to the master cylinder through a front brake conduit;

a rear wheel brake connected to the master cylinder through a rear brake conduit;

a front reservoir connected to the front wheel brake;

a rear reservoir connected to the rear wheel brake;

a front control valve for selectively connecting and preventing connection of the front wheel brake to the master cylinder;

a rear control valve for selectively connecting and preventing connection of the rear wheel brake to the master cylinder;

a front fluid pump for discharging brake fluid to the master cylinder from the front reservoir;

a rear fluid pump for discharging brake fluid to the master cylinder from the rear reservoir;

a front changeover valve for selectively connecting and disconnecting the master cylinder to and from a discharge port of the front fluid pump;

a rear changeover valve for selectively connecting and disconnecting the master cylinder to and from a discharge port of the rear fluid pump;

a front suction conduit connecting the master cylinder and a suction port of the front fluid pump;

a rear suction conduit connecting the master cylinder and a suction port of the rear fluid pump; and means connected to the front brake conduit and the rear brake conduit for equalizing brake pressure differentials between the front wheel brake and the rear wheel brake, said means for equalizing brake pressure differentials between the front wheel brake and the rear wheel brake including a cylinder, a balance piston slidably disposed in the cylinder, and a pair of springs each located between the balance piston and one end of the cylinder.

6. A brake pressure control device for a vehicle as recited in claim 5, wherein the rear wheel brake is a first rear wheel brake and including a second rear wheel brake connected to the master cylinder through the rear brake conduit.

7. A brake pressure control device for a vehicle as recited in claim 5, wherein said means for equalizing brake pressure differentials between the front wheel brake and the rear wheel brake is connected to the front brake conduit between the front control valve and the front changeover valve and is connected to the rear brake conduit between the rear control valve and the rear changeover valve.

8. A brake pressure control device for a vehicle as recited in claim 5, wherein the balance piston divides the cylinder into a front variable volume chamber included in a front brake circuit and a rear variable volume chamber included in a rear brake circuit.

9. A brake pressure control device for a vehicle as recited in claim 5, wherein both the front changeover valve and the rear changeover valve are 2-position, 2-port electromagnetic valves.

10. A brake pressure control device for a vehicle as recited in claim 5, wherein both the front changeover valve and the rear changeover valve are 2-position, 3-port electromagnetic valves.

11. A brake pressure control device for a vehicle comprising:

a master cylinder;

a front wheel brake connected to the master cylinder through a front brake conduit;

a rear wheel brake connected to the master cylinder through a rear brake conduit;

a front reservoir connected to the front wheel brake;

a rear reservoir connected to the rear wheel brake;

a front control valve for selectively connecting and preventing connection of the front wheel brake to the master cylinder;

a rear control valve for selectively connecting and preventing connection of the rear wheel brake to the master cylinder;

a front fluid pump having a suction port communicating with the rear reservoir for discharging brake fluid drawn from the front reservoir;

a rear fluid pump having a suction port communicating with the rear reservoir for discharging brake fluid drawn from the rear reservoir;

a front changeover valve for selectively permitting and preventing communication between the master cylinder and a discharge port of the front fluid pump;

a rear changeover valve for selectively permitting and preventing communication between the master cylinder and a discharge port of the rear fluid pump;

a front suction conduit connecting the master cylinder and the suction port of the front fluid pump;

a rear suction conduit connecting the master cylinder and the suction port of the rear fluid pump; and a cylinder connected to the front brake conduit and the rear brake conduit, and a spring biased piston disposed in the cylinder for equalizing brake pressure differentials between the front wheel brake and the rear wheel brake.

12. A brake pressure control device for a vehicle as recited in claim 11, wherein the piston divides the cylinder into a front variable volume chamber included in a front brake circuit and a rear variable volume chamber included in a rear brake circuit.

13. A brake pressure control device for a vehicle as recited in claim 11, wherein both the front changeover valve and the rear changeover valve are 2-position, 2-port electromagnetic valves.

14. A brake pressure control device for a vehicle as recited in claim 11, wherein both the front changeover valve and the rear changeover valve are 2-position, 3-port electromagnetic valves..

15. A brake pressure control device for a vehicle as recited in claim 11, wherein the rear wheel brake is a first rear wheel brake and including a second rear wheel brake connected to the master cylinder through the rear brake conduit.

16. A brake pressure control device for a vehicle as recited in claim 11, wherein said cylinder is connected to the front brake conduit between the front control valve and the front changeover valve and is connected to the rear brake conduit between the rear control valve and the rear changeover valve.

* * * * *